United States Patent [19]

Scheuerle

[11] Patent Number: 4,470,615

[45] Date of Patent: Sep. 11, 1984

[54] FLUID-OPERATED SUPPORTING ARRANGEMENT AND A CONDUIT BREAKAGE SAFETY DEVICE

[75] Inventor: Willy Scheuerle, Pfedelbach, Fed. Rep. of Germany

[73] Assignee: Willy Scheuerle Fahrzeugfabrik GmbH & Co., Pfedelbach, Fed. Rep. of Germany

[21] Appl. No.: 382,191

[22] Filed: May 25, 1982

[30] Foreign Application Priority Data

May 30, 1981 [DE] Fed. Rep. of Germany ....... 3121630

[51] Int. Cl.³ ............................................. B60G 25/00
[52] U.S. Cl. .................................. 280/702; 280/709; 280/711; 280/714
[58] Field of Search ............... 280/702, 704, 709, 710, 280/711, 714

[56] References Cited

U.S. PATENT DOCUMENTS 3,207,254 9/1965 Venel ................................... 280/702
3,433,493 3/1969 Hirst ................................... 280/702
3,620,542 11/1971 Hovorka ............................. 280/702

Primary Examiner—Richard A. Bertsch
Attorney, Agent, or Firm—Michael J. Striker

[57] ABSTRACT

A fluid-operated supporting arrangement has fluid-operated supporting elements connected with a further fluid element by pairs of connecting conduits, and a safety element associated with the further fluid element and arranged so that the connecting conduits of each of the pairs of connecting conduits are open separately into the further fluid element, and the safety element has two pressure-controlled closing members each arranged to close a respective one of the connecting conduits of the respective pair of connecting conduits. A conduit breakage safety device is provided with two separate passages each separately communicating a respective one of two connecting conduits of each of the pairs with a further fluid element, and two pressure-controlled closing members each arranged to close a respective one of the passages.

31 Claims, 5 Drawing Figures

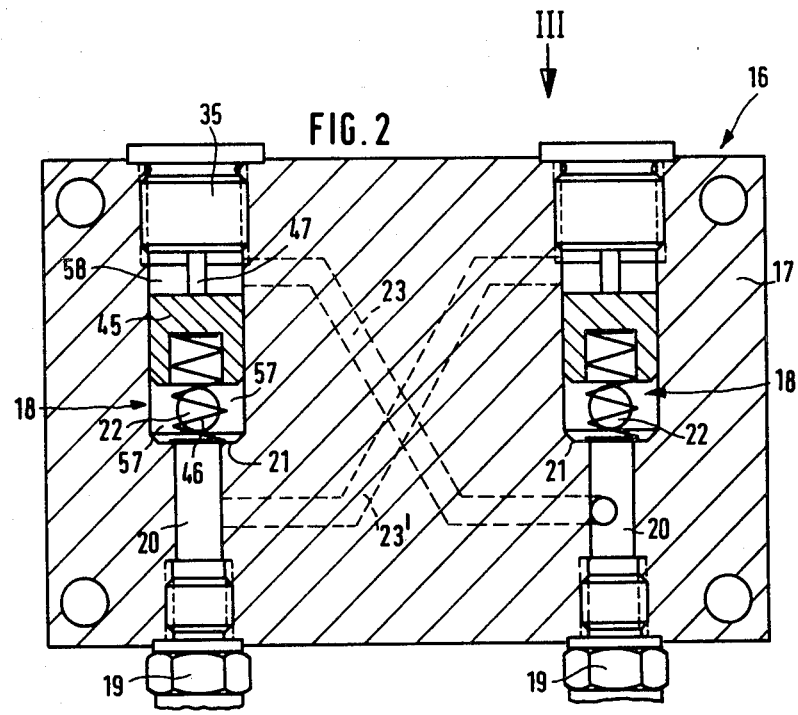
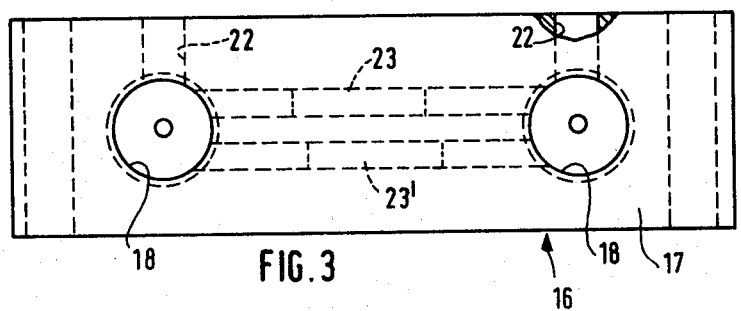

FLUID-OPERATED SUPPORTING ARRANGEMENT AND A CONDUIT BREAKAGE SAFETY DEVICE

BACKGROUND OF THE INVENTION

The present invention relates to a fluid-operated supporting arrangement for a travelling mechanism having a plurality of wheels or wheel sets. It also generally relates to a safety device for pairs of any conduits.

Arrangements and devices of the above mentioned general type are known in the art. In a known pneumatic or hydraulic supporting arrangement there are a plurality of pneumatic or hydraulic supporting elements, such as cylinder-and-piston units, which support individual wheels or wheel sets and are connected in groups with one another and/or with a pneumatic or hydraulic accumulator via pairs of conduits which are provided near the supporting element or the accumulator with conduit breakage safety devices reacting to breakage of conduits. In conventional constructions, when one conduit of a pair of broken, the operational ability of the hydraulic or pneumatic mechanism, particularly the travelling mechanism, is maintained by the conduit breakage safety device, inasmuch as the broken conduit is blocked for preventing further losses of pneumatic or hydraulic medium. The remaining, unbroken conduit is sufficient in some cases for the operation of the arrangement. One such conduit breakage safety device for hydraulic travelling mechanisms is disclosed, for example, in German Pat. No. 2,319,611. In this device, two hydraulic cylinders are connected with one another by two separate, parallel-arranged conduits which communicate with the cylinders with interposition of a three-way valve. One passage of the three-way valve leads to the associated cylinder, whereas the two other passages lead to the conduits connected in parallel. The safety valve includes a common closing member for both conduit passages, which in its intermediate position opens both conduit passages and, during breakage of one conduit, displaces under the action of the thus produced flow pulse for blocking the passage leading to the not-tight conduit. In this safety device, the valve-closing member displaces when the flow to one conduit passage is stronger than that to the other conduit passage. Thereby, the displacement of the closing member increases the resistance of the flow to one conduit passage, and reduces the resistance of the flow to the other conduit passage. As a result of this, vibrations which take place during the travel and insignificantly different flow forces to both conduit passages can be increased, and therefore undesirable chatter vibrations of the connecting parts can take place. This reduces the operational safety of the conduit breakage safety device.

SUMMARY OF THE INVENTION

Accordingly, it is an object of the present invention to provide a fluid-operated supporting arrangement and a conduit breakage safety device for pairs of conduits, which avoid the disadvantages of the prior art.

More particularly, it is an object of the present invention to provide a fluid-operated supporting arrangement and a conduit breakage safety device which guarantee an especially reliable blocking of the broken conduit.

In keeping with these objects, and with others which will become apparent hereinafter, one feature of the present invention resides, briefly stated, in a fluid-operated supporting arrangement and/or a safety device in which conduit of each pair opens separately from the other conduit of the same pair into an associated fluid element such an associated fluid-operated supporting element or an accumulator, and is closable there by its own closing member which, advantageously, forms a pressurecontrol means.

In such a construction, displacement of a closing member associated with one conduit of a pair does not produce any direct action upon the closing member of the other conduit of the same pair. Moreover, the pressure control makes it possible to maintain the closing member below critical pressure fluctuations which, when overcome, require blocking of a conduit. The inventive construction also provides for considerably improved reproducibility of conditions of the conduit breakage safety device.

In accordance with another advantageous feature of the present invention, the closing member or a piston actuating the closing member for each conduit is displaceably arranged in a cylinder chamber, wherein one subchamber associated with one actuating face (front face) of the piston communicates with the associated conduit, whereas the other subchamber associated with the other actuating face (rear face) of the piston is connectable with the other conduit. The pressure of a conduit to be secured by a piston acts upon the front side of this piston and loads the rear side of the piston against the pressure of the other conduit. Since in the conduits of the pair of conduits practically identical pressure conditions prevail during normal operation, the pistons are subjected at both their actuating faces to practically identical or fixed and identically maintained conditions of opposite pressures. Any significant deviations of the pressure conditions take place first during breakage of one of the conduits, or in other words the piston displaces in its closing position when the pressure in a conduit secured by the piston considerably falls as a result of the conduit breaking.

When a travelling mechanism or vehicle runs on surface waves, individual wheels or wheel sets of one group perform upward movements whereas the wheelsor wheel sets of the other groups perform downward movements. Great pressure-medium quantities are conveyed from one supporting element to another supporting element, and in some cases to a pressure-medium accumulator serving for spring-suspension purposes. These pressure-medium streams are connected with different pressures in the supporting elements or in the accumulator and the conduits. For preventing blocking of conduits during acceptable pressure variations, the pistons can be loaded, for example by spring means, to its open position and/or formed as differential pistons whose smaller actuating face is loaded by a reference pressure, for example by a pressure from the other conduit.

In accordance with still another especially advantageous feature of the present invention, for travelling mechanisms as well as for other arrangements, the inventive safety device has a housing with separate passages having a connecting passage for a consumer, particularly a supporting element or an accumulator, and a connecting passage to a conduit connected with the first-mentioned connecting passage, and a piston-actuated closing member with a piston displaceable in a cylinder chamber whose one end communicates with a reference pressure source and whose other end is connected with the associated conduit in closed and open positions of the closing member.

Still a further advantageous feature of the present invention is that the piston itself is formed as a closing member and arranged in a cylinder chamber which opens into a communication path between the abovementioned passages. In this construction, the safety device can be provided with a relatively small number of bore holes in its housing.

It is especially advantageous for this purpose when the passages for each conduit of the pair are located at an angle relative to one another, preferably normal to one another, and the cylinder chamber forms an extension of the passage in the housing.

The cylinder chamber may be formed as an opening which extends from one housing side and closed at this side, wherein the opening is formed as an extension of the passage with formation of a shoulder, and the other passage opens radially or laterally into this opening. The piston arranged in this cylinder chamber abuts in its end position against the shoulder and closes an inlet of the second-mentioned passage. In another end position spaced from the shoulder, the piston opens the inlet of the second-mentioned passage.

The pistons can have any practically suitable form, and their dimensions must be sufficient to overlap in the closing position the inlet of the passage which opens into the abovementioned opening.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a view showing a section of a conduit breakage safety device in accordance with the present invention;

FIG. 3 is a plan view of a conduit breakage safety device of FIG. 2, taken in direction of the arrow 3 in FIG. 2;

DESCRIPTION OF THE PREFERRED EMBODIMENTS

Figure 1:
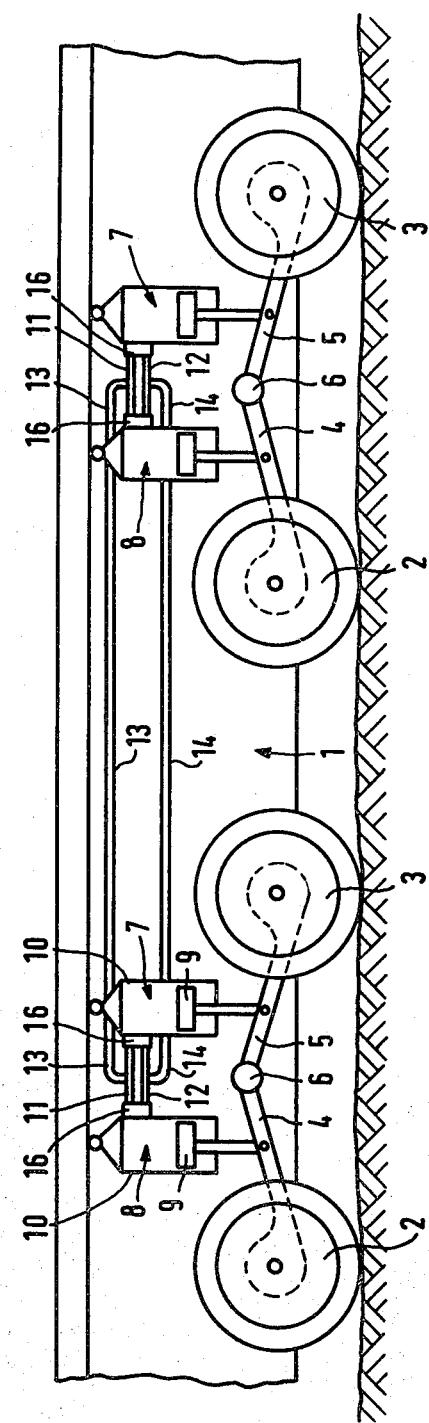
FIG. 1 is a fluid-operated supporting arrangement for a travelling mechanism, in accordance with the present invention.

A vehicle shown in FIG. 1 has wheels 2 and 3 arranged one behind the other. The wheels 2 and 3 are suspended in a vertically adjustable manner on the vehicle 1 with the aid of links 4 and 5 of suitable construction. The links 4 and 5 are pivotally connected with one another and with the vehicle 1 by a member 6. Each link 4 and 5, and the associated wheel 2 or 3, is supported by a respective one of supporting elements 7 and 8 on the vehicle 1.

Each of the supporting elements 7 and 8 has a piston 9 and a cylinder 10 in which the piston 9 displaces. The cylinders 10 are connected with one another by conduits 11 and 12, for equalization purposes. The conduits 11 and 12 can be connected via conduits 13 and 14 with further supporting elements or with a not shown accumulator for pressure medium.

When the vehicle 1 runs over a surface wave, for example the wheel 2 displaces in an upwards direction. The piston 9 of the supporting element 8 displaces the pressure medium from the associated cylinder 10 into the cylinder of the other supporting element 7, and thereby causes a downward movement of the wheel 3 relative to the vehicle 1. By this equalization, a uniform distribution of the supporting load of the vehicle 1 takes place during the operation of the arrangement.

For the case when one of the conduits 11 or 12 is broken, a conduit breakage safety device 16 is arranged on the cylinders 10. It blocks in the respective cases the broken conduit 11 or 12 so that the supporting elements 7 and 8 communicate with one another only via the other conduit, 12 or 11.

The conduit breakage safety device 16 is shown in FIGS. 2 and 3 and has a square housing 17 in which parallel openings 18 extend from its one side. The openings 18 open in coaxial passages 19. Between the openings 18 and the passages 19 a constriction 20 is provided so as to form, between the constriction 20 and the openings 18, an annular shoulder 21.

Transverse passages 22 extend from one housing side radially to the openings 18 and open in the vicinity of the annular shoulders 21 into the openings 18.

As considered in FIG. 2, the upper portion of the left opening 18 is connected via a bore hole 23 with the right constriction 20. In the same manner, the upper region of the right opening 18 is connected via a bore hole 23' with the left constriction 20. The openings 18 are closed at the outer side of the housing by threaded closures 35.

Cup-shaped pistons 45 are displaceably arranged in the openings 18. The cup-shaped openings of the pistons face toward the annular shoulders 21 and receive helical springs 22. The springs 22 abut against the annular shoulders 21 and urge displacements of the pistons 45 against abutment pins 47 associated with the threaded closures 35.

The pistons 45 can be displaced against the pressure of the springs 46 until they abut against the annular shoulders 21. In this case, inlets of the transverse passages 22 in the openings 18 will be closed. The inlets of the bore holes 23 and 23' in the openings 18 remain open, even in the position in which the pistons 45 abut against the abutment pins 47.

The conduit breakage safety device 16 shown in FIGS. 2 and 3 operates in the following manner:

The transverse passages 22 serve as connecting conduits to the cylinders 10 of one supporting element 7 or 8 in FIG. 1, on which the conduit breakage safety device is arranged. Each of the conduits 11 or 12 is connected with a respective one of the passages 19 and 20, so that each conduit communicates in the upper end position of the pistons 45 with the associated supporting element 7 or 8. The pressure acting on the constrictions is present also as a reference pressure in subchamber 58 of the openings 18, the subchamber 58 located at the piston side facing toward the threaded closures 35. This takes place because the subchambers 58 are connected via the bore holes 23 and 23' with the respective restrictions 20 so that the pressure equilibrium, regardless of the throttling losses, is provided between the left restriction 20 and the right subchamber 58, as well as between the right restriction 20 and the left subchamber 58.

When the conduits connected with the passages 19 are intact, the state of equilibrium during flow of the pressure medium prevails in the above-mentioned passages and constrictions 20, inasmuch as the communicating conduits as well as their connecting paths from the passages 19 to the passages 22 have identical geometries.

Identical pressures act upon the front and rear sides of the pistons 45, and the springs 46 can hold the pistons 45 in the upper end position shown in FIG. 2.

When the pressure, for example in the left passage in FIG. 2, drops because of breakage of the associated conduit, the respective piston 45 displaces toward a subchamber 57 associated with the respective restriction 20 of a respective opening 18. Thereby, the inlet of the respective transverse passage 22 in the respective opening 18 is closed, and the communication from the left passage 19 to the left transverse passage 22 is blocked.

The displacement of the left piston 45 takes place when its rear side is loaded by pressure in the right restriction 20 which communicates with an intact conduit, since the above-mentioned constriction 20 is in communication via the bore hole 23 with the subchamber 58 of the left opening 18.

As a result of this, in the event of conduit breakage of one of the conduits 11 and 12, the defective conduit is blocked, whereas the conduit which remains unbroken serves for communication of the coupled supporting elements 7 and 8 with one another.

It will be understood that each of the elements described above, or two or more together, may also find a useful application in other types of constructions differing from the types described above.

While the invention has been illustrated and described as embodied in a fluid-operated supporting arrangement and a conduit breakage safety device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

Figure 4:
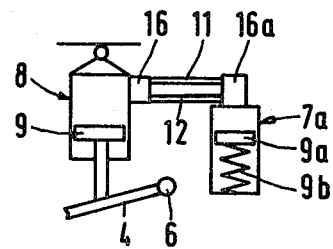
FIG. 4 is another arrangement of the invention.

In the modified embodiment of the invention according to FIG. 4 a second fluid element 7a is a hydraulicly or pneumaticly operated fluid element with a piston 9a urged by a spring 9b and a safety element 16a acting principally as the safety element 16.

Figure 5:
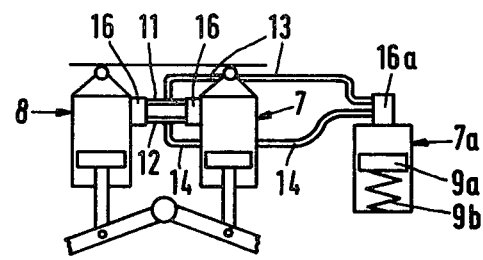
FIG. 5 is a further arrangement of the invention according to FIG. 1.

In the modified embodiment of the invention according to FIG. 5 the connecting conduits 11 and 12 of one pair of fluid supporting elements 7 and 8 are connected to a safety element 16a associated to a hydraulic or pneumatic accumulator 7a corresponding to the accumulator according to FIG. 4.

In place of the piston 9a and the spring 9b may be arranged a gas filled compressible hollow body for example a ballshaped body acting like the piston 9a and the spring 9b.

Alternatively such shock absorbating elements may be arranged in the supporting elements 7 or 8 respectively.

I claim:

1. A fluid-operated supporting arrangement for a plurality of wheel elements of a travelling mechanism comprising a plurality of fluid-operated supporting elements each arranged to support a respective one of the plurality of wheel elements; a further fluid element; a plurality of pairs of connecting conduits arranged so that each pair of connecting conduits connects each of said supporting elements with said further fluid element so as to equalize upward movements of individual wheel elements; and a plurality of safety elements each associated with said further fluid element and arranged to act in response to breaking one of the connecting conduits of a respective one of said pairs of connecting conduits, the connecting conduits of each of said pairs of connecting conduits being open separately in said further fluid element, and each of said safety elements including two pressure-controlled closing members each arranged to close a respective one of the connecting conduits of the respective pair of connecting conduits.

2. A fluid-operated supporting arrangement as defined in claim 1, wherein said fluid-operated supporting elements are formed by hydraulic cylinder-and-piston units.

3. A fluid-operated supporting arrangement as defined in claim 1, wherein said fluid-operated supporting elements are formed by pneumatic cylinder-and-piston units.

4. A fluid-operated supporting arrangement as defined in claim 1, wherein said further fluid elements are formed as hydraulic accumulators.

5. A fluid-operated supporting arrangement as defined in claim 1, wherein said further fluid elements are formed as pneumatic accumulators.

6. A fluid-operated supporting arrangement as defined in claim 1, wherein said plurality of fluid-operated supporting elements includes a first plurality of fluid-operated supporting elements and a second plurality of fluid-operated supporting elements, the fluid-operated supporting elements of said second plurality forming said further fluid element, so that each of said pair of connecting conduits connects each fluid-operated supporting element of said first plurality with a respective one of the fluid-operated supporting elements of said second plurality.

7. A fluid-operated supporting arrangement as defined in claim 1, wherein said closing members of said safety devices are piston-actuated.

8. A fluid-operated supporting arrangement as defined in claim 1, wherein each of said closing members has two opposite acting faces, each of said safety devices having two cylinder chambers in each of which a respective one of said two closing members is displaceably arranged, each of said two cylinder chambers of each of said safety devices having one subchamber associated with one of said acting faces of a respective one of said closing members and communicating with one connecting conduit of a respective one of said pairs of connecting conduits, and another subchamber associated with the other of said acting faces of the same closing member and communicating with the other connecting conduit of the same pair of connecting conduits.

9. A fluid-operated supporting arrangement as defined in claim 1, wherein said supporting elements are arranged in groups; and further comprising a further plurality of pairs of such connecting conduits arranged so that each pair of the connecting conduits of said further plurality connect one group of said supporting elements with said further fluid element, and a further plurality of such safety elements associated with said further fluid element and each arranged to act in response to breaking one of the connecting conduits of the respective pair of said further plurality of pairs of connecting conduits.

10. A fluid-operated supporting arrangement as defined in claim 1, wherein said further fluid element is formed as a accumulator element having a fluid chamber connected to at least one pair of said connecting conduits and having a elastically compressible member associated to said chamber for elastically alternating the volume of said chamber.

11. A conduit breakage safety device, particularly for a mechanism having a plurality of fluid-operated elements, a further fluid element, and a plurality of pairs of connecting conduits arranged so that each pair of connecting conduits connects each of the fluid-operated elements with the further fluid element, the safety device comprising means forming two separate passages each separately communicating a respective one of the two connecting conduits of each of the pairs of connecting conduits with the further fluid element; and two pressure-controlled closing members each arranged to close a respective one of said passages.

12. A conduit breakage safety device as defined in claim 11; and further comprising a housing, said two passages being formed in said housing and having a first partial passage arranged to be connected with the further fluid element, a second partial passage arranged to be connected with a respective one of the two connecting conduits of a respective one of the pairs of connecting conduits and communicating with the second partial passage of the same passage.

13. A conduit breakage safety device as defined in claim 12, wherein said housing has two cylinder chambers in each of which a respective one of said closing members displaces, each of said two cylinder chambers having one end communicatable with a reference pressure source and another end communicating with a respective one of said second partial passage both in closed and open conditions of a respective one of said closing members.

14. A conduit breakage safety device as defined in claim 13, wherein the second partial passage of the other of said two passages form said reference pressure source.

15. A conduit breakage safety device as defined in claim 13, wherein each of said closing members is formed as a piston displaceable in a respective one of said cylinder chambers.

16. A conduit breakage safety device as defined in claim 13, wherein said first partial passage and said second partial passage of each of said passages are arranged at an angle relative to one another, each of said cylinder chambers being formed as an extension of the second partial passage of a respective one of the two passages.

17. A conduit breakage safety device as defined in claim 16, wherein said first partial passage and said second partial passage of each of said two passages are normal to one another.

18. A conduit breakage safety device as defined in claim 13, wherein each of said cylinder chambers is formed as an opening which extends from one side of said housing, is closed at said one side and arranged as an extension of the second partial passage of a respective one of said two passages with formation of an intermediate shoulder, the first partial passage of the same passage having an inlet which opens laterally into said opening.

19. A conduit breakage safety device as defined in claim 18; and further comprising a plurality of closures each closing the inlet of a respective one of said openings.

20. A conduit breakage safety device as defined in claim 18, wherein each of said closing members is formed as a piston displaceable in a respective one of said cylinder chambers, said shoulders of said cylinder chambers being arranged so that when each of said pistons is in one of its end positions it abuts against the shoulder of a respective one of said cylinder chambers and closes the inlet of said second partial passage of a respective one of said passages, and when each of said pistons is in another end portion spaced from said shoulder it opens said inlet.

21. A conduit breakage safety device as defined in claim 14, wherein each of said closing members is formed as a piston which has a reference pressure side and displaces in and subdivides a respective one of said cylinder chambers into two subchambers, one of said subchambers being arranged at said reference pressure side of said piston, and said housing having a bore hole which communicates the other subchamber of each of said cylinder chambers with the second partial passage communicating with the other of said cylinder chambers.

22. A conduit breakage safety device as defined in claim 21, wherein a reference pressure acts at the reference pressure side of each of said pistons; and further comprising spring means arranged for acting upon each of said pistons in direction against said reference pressure.

23. A conduit breakage safety device as defined in claim 22; and further comprising means forming an abutment for abutting of each of said spring means thereagainst, said abutment being formed as an annular shoulder.

24. A fluid-operated supporting arrangement for at least one wheel element of a travelling mechanism comprising at least one fluid-operated supporting element arranged to support said at least one wheel element; a further fluid element; at least one pair of connecting conduits arranged so that said pair of connecting conduits connects said at least one supporting element with said further fluid element so as to equalize upward movements of said at least one wheel element; and a plurality of safety elements one of which being associated to said supporting element and another one of which being associated with said further fluid element, said safety elements being arranged to act in response to breaking one of the connecting conduits of said pair of connecting conduits, the connecting conduits of said pair of connecting conduits being open separately in said further fluid element, and each of said safety elements including two pressure-controlled closing members each arranged to close a respective one of the connecting conduits of the pair of connecting conduits.

25. A fluid-operated supporting arrangement as defined in claim 24, wherein said fluid-operated supporting element is formed by hydraulic cylinder-and-piston unit.

26. A fluid-operated supporting arrangement as defined in claim 24, wherein said fluid-operated supporting element is formed by pneumatic cylinder-and-piston unit.

27. A fluid-operated supporting arrangement as defined in claim 24, wherein said further fluid element is formed as hydraulic accumulator.

28. A fluid-operated supporting arrangement as defined in claim 24, wherein said further fluid element is formed as pneumatic accumulator.

29. A fluid-operated supporting arrangement as defined in claim 24, with a plurality of fluid-operated supporting elements including a first fluid-operated supporting element and a second fluid-operated supporting element, said second fluid-operated supporting element forming said further fluid element, so that said pair of connecting conduits connects said first fluid-operated supporting element with said second fluid-operated supporting element forming said further fluid element.

30. A fluid-operated supporting arrangement as defined in claim 24, wherein each of said closing members has two opposite acting faces, each of said safety devices having two cylinder chambers in each of which a respective one of said two closing members is displaceably arranged, each of said two cylinder chambers of each of said safety devices having one subchamber associated with one of said acting faces of a respective one of said closing members and communicating with one connecting conduit of a respective one of said pairs of connecting conduits, and another subchamber associated with the other of said acting faces of the same closing member and communicating with the other connecting conduit of the same pair of connecting conduits.

31. A fluid-operated supporting arrangement having several hydraulic and/or pneumatic supporting elements such as, in particular, piston-in-cylinder units, each supporting individual wheels or sets of wheels, wherein the supporting elements are connected together in groups and/or with a fluid accummulator via pairs of connecting conduits, each of the pairs of connecting conduits connecting the supporting elements to each other and/or to the fluid accumulator, so as to compensate for upwards movements of the individual wheels, and wherein the pairs of connecting conduits are protected near to the supporting elements and/or said accumulator by line breakage safety elements which respond to line breakages, wherein each conduit of said pair of connecting conduits opens separately from the other into the associated supporting element and/or the accumulator and can be closed off there by its own pressure controlled closure member disposed in a respective one of the line breakage safety elements so as to prevent the failure of the fluid-operated supporting arrangement by closing off only the conduit of the pair of connecting conduits that is severed while leaving the other conduit of the pair of connecting conduits that is not severed, operational to compensate for the several conduit and thus preventing fluid pressure lose in the fluid-operated supporting arrangement.

* * * * *